US009313036B2

(12) United States Patent
Mizusawa

(10) Patent No.: US 9,313,036 B2
(45) Date of Patent: Apr. 12, 2016

(54) COMMUNICATION FEE PREDICTION DEVICE, COMMUNICATION DEVICE, COMMUNICATION SYSTEM, AND CHARGING METHOD

(75) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 501 days.

(21) Appl. No.: 13/349,990

(22) Filed: Jan. 13, 2012

(65) Prior Publication Data

US 2012/0190326 A1 Jul. 26, 2012

(30) Foreign Application Priority Data

Jan. 21, 2011 (JP) ................................ P2011-010851

(51) Int. Cl.
*H04M 11/00* (2006.01)
*H04L 12/14* (2006.01)
*H04W 4/24* (2009.01)
*H04M 15/00* (2006.01)

(52) U.S. Cl.
CPC ........ *H04L 12/1421* (2013.01); *H04L 12/1489* (2013.01); *H04M 15/58* (2013.01); *H04M 15/835* (2013.01); *H04M 15/8351* (2013.01); *H04M 15/84* (2013.01); *H04M 15/85* (2013.01); *H04W 4/24* (2013.01)

(58) Field of Classification Search
CPC ... H04W 4/24; H04W 28/08; H04M 2215/32; H04M 1/72519; H04H 60/33; H04B 1/40; H04L 29/08108
USPC ........ 455/406, 405, 453, 517, 566, 68, 414.1; 370/311
See application file for complete search history.

(56) References Cited

U.S. PATENT DOCUMENTS

| 8,098,748 | B1 * | 1/2012 | Mansour et al. ............... 375/260 |
| 2002/0183039 | A1 * | 12/2002 | Padgett et al. ................ 455/406 |
| 2004/0204124 | A1 * | 10/2004 | Campbell ..................... 455/566 |
| 2005/0049008 | A1 * | 3/2005 | Muto ........................... 455/566 |

(Continued)

FOREIGN PATENT DOCUMENTS

WO        WO 01-43463        6/2001

OTHER PUBLICATIONS

English-Language European Search Report in corresponding Appliciaton No. 12151075.4., mailed May 21, 2012.

*Primary Examiner* — Charles Appiah
*Assistant Examiner* — Alexander Yi
(74) *Attorney, Agent, or Firm* — Hazuki International, LLC

(57) ABSTRACT

A communication fee prediction device including: a communication unit; a network load information management unit that collects and retains network load information of each base station through the communication unit; a user behavior history management unit that collects and retains positional information of a data communication terminal; and a fee prediction unit that estimates a later movement path of a data communication terminal, estimates a network load state when a data communication terminal passes through a base station on the estimated movement path, and predicts a communication fee according to a network load state of a base station that a data communication terminal is currently position registering and a communication fee according to a network load state of a base station on the estimated movement path, wherein a data communication terminal is notified of the current communication fee and the predicted value of a communication fee through the communication unit.

18 Claims, 13 Drawing Sheets

(56) References Cited

U.S. PATENT DOCUMENTS

| | | | |
|---|---|---|---|
| 2005/0239468 A1* | 10/2005 | Segal | 455/444 |
| 2006/0040641 A1 | 2/2006 | Dawson et al. | |
| 2007/0238447 A1* | 10/2007 | Balestrieri | 455/414.1 |
| 2007/0270135 A1* | 11/2007 | Gaschler | 455/414.3 |
| 2009/0131044 A1* | 5/2009 | Marini et al. | 455/424 |
| 2010/0085904 A1* | 4/2010 | Hamaue et al. | 370/311 |

* cited by examiner

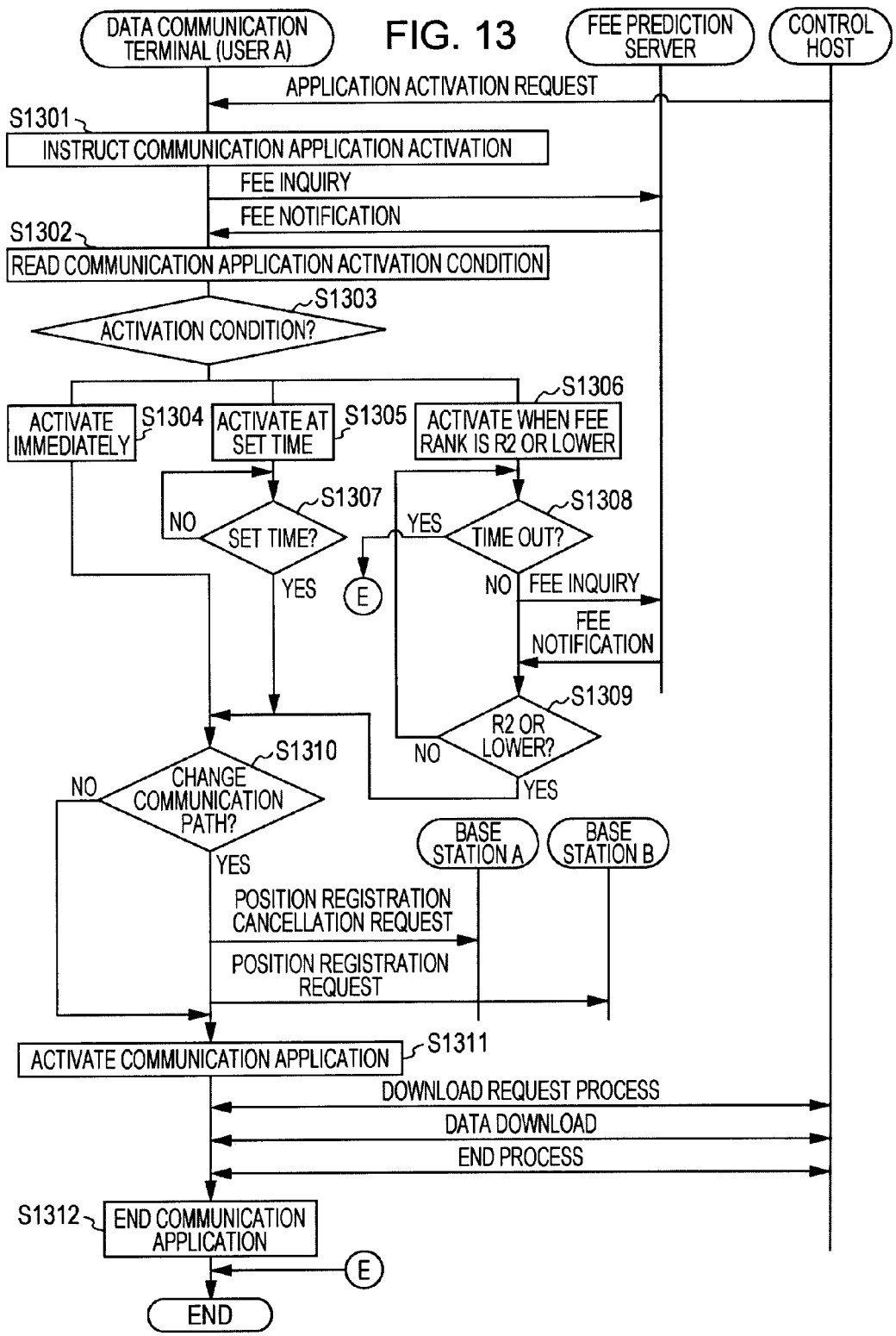

COMMUNICATION FEE PREDICTION DEVICE, COMMUNICATION DEVICE, COMMUNICATION SYSTEM, AND CHARGING METHOD

BACKGROUND

The present disclosure relates to a communication fee prediction device that predicts a communication fee that is charged to a data communication terminal that performs wireless communication, a communication device that performs communication by activating a communication application, a communication system in which the data communication terminal performs data communication, and a charging method of charging a communication fee per unit data to the data communication terminal that performs communication using a network.

While Wide Area Networks such as the Internet or mobile phone systems are widely used, it is recognized that the traffic thereof is not fixed but changes according to time band. For example, in Japan, the peaks of Internet traffic are distributed between 19:00 and 23:00 for both downloads and uploads (for example, refer to http://www.soumu.go.jp/main_content/000055966.pdf (updated February 2010)). Due to the recent rapid increase in traffic, networks are becoming congested particularly during peak time bands, and there is a demand for counter-measures.

The fee structure of mobile phone services is generally configured by a basic usage fee, a communication fee, a packet communication fee, and the like. For example, the communication fee is a fee for the basic unit price of communication for a unit time, and the packet communication fee is set as a fee for the basic unit price of unit data amounts. Further, for example, there may be a case when the communication fee and the packet communication fee are set to be the values of the basic unit price according to the time band. Furthermore, for example, there may be a case when the communication fee and the packet communication fee are set to be a fixed fee for use within a given time range or a data amount range.

Many users use communication services by activating communication applications such as downloading of content without being aware of the congestion state of a network. However, if traffic becomes concentrated in excess of anticipated capacity, data loss occurs, wasteful processes such as retransmission occur, and huge loads are placed on the network, while the communication speeds for users decrease dramatically. In order to run a network stably without causing such a situation, it is preferable to construct network facilities with for a capacity for additional traffic besides the anticipated traffic, and for communication carriers to invest in facilities that take peaks in traffic into account.

While it is anticipated that data communication traffic will continue to increase in the future, augmenting facilities to support concentration in traffic will incur an enormous cost. Further, wireless resources still have limits regardless of whether facilities are augmented. Therefore, in order for many users to be able to use data communication, there is a demand to distribute traffic.

For example, a wireless communication system has been proposed that distributes traffic by surcharging the communication fee and displaying the surcharge on the terminal when the network is congested and discouraging users in such a case from activating communication as much as possible (for example, refer to Japanese Unexamined Patent Application Publication No. 2010-109418). According to such a system, it is hoped that network congestion will be reduced as there is a possibility that the activation of a communication application of low importance will be avoided when a user sees the display. However, although such a system is able to suppress demand for communication and stabilize the network during network congestion, it is difficult to say that the system acts directly to reduce changes in the load of demand for communication, that is, to distribute traffic.

SUMMARY

It is desirable to provide an excellent communication fee prediction device that is able to act directly to reduce changes in the load of demand for communication, that is, to distribute traffic, a communication device, a communication system, and a charging method.

According to a first embodiment of the present disclosure, there is provided a communication fee prediction device including: a communication unit; a network load information management unit that collects and retains network load information of each base station through the communication unit; a user behavior history management unit that collects and retains positional information of a data communication terminal of a user through the communication unit; and a fee prediction unit that estimates a later movement path of a data communication terminal based on past positional information of a data communication terminal which is retained in the user behavior history management unit, estimates a network load state when a data communication terminal passes through a base station on the estimated movement path based on network load information of each base station which is held in the network load information management unit, and predicts a communication fee according to a network load state of a base station that a data communication terminal is currently position registering and a communication fee according to a network load state of a base station on the estimated movement path based on the estimated network load state of a base station, wherein a data communication terminal is notified of the current communication fee and the predicted value of a communication fee through the communication unit.

According to a second embodiment of the present disclosure, there is provided a communication device including: a communication unit that performs wireless communication; a positional information obtaining unit that obtains information of the current position; a control unit that executes various processes; and an activation condition setting section that sets an activation condition of a communication application that performs communication using a network, wherein a notification of positional information obtained by the positional information obtaining unit and a communication fee inquiry when using a network are made through the communication unit, and communication is performed using a network by the control unit activating the communication application when the set activation condition is met.

The communication device according to the second embodiment may further include a display unit. Further, a communication fee that is received by an inquiry may be displayed on the display unit and a screen for selecting an activation condition of the communication application may be displayed on the display unit, the activation condition setting section may set an activation condition that is selected through the screen, and communication may be performed using a network by the control unit activating the communication application when a communication fee that is received by an inquiry meets the set activation condition.

The activation condition setting section of the communication device according to the second embodiment may set an activation condition of the communication application following an instruction that is received from a different host through the communication unit or may set an activation condition that is stored in advance, and communication may be performed using a network by the control unit activating the communication application when the current communication fee meets the set activation condition.

The communication device according to the second embodiment may further include an operation unit that receives an operation by a user. Further, a communication fee inquiry may be made as activation of the communication application is instructed through the operation unit.

In the communication device according to the embodiment, a communication fee inquiry may be made as activation of the communication application is instructed by the different host through the communication unit.

In the communication device according to the second embodiment, a communication fee inquiry may be made regularly.

The communication device according to the second embodiment may further include an operation unit that receives an operation by a user. Further, an inquiry of a communication fee may be made as an inquiry of a communication fee is instructed through the operation unit.

In the communication device according to the second embodiment, an inquiry of a communication fee may be made according to a wireless measurement result in the communication unit.

The communication device according to the second embodiment may further include an operation unit that receives an operation by a user. Further, the activation condition setting section may perform setting of an activation condition as activation of the communication application is instructed through the operation unit.

In the communication device according to the second embodiment, the activation condition setting section may set an activation condition based on information that is stored in advance in a predetermined storage unit.

The communication device according to the second embodiment may further include a storage unit that stores a threshold value of a communication fee in advance. Further, the activation condition setting section may prompt a user to select an activation condition when a communication fee that is received by an inquiry exceeds the threshold value.

The activation condition setting section of the communication device according to the second embodiment may be able to set at least one of a range of communication fees that permit activation of a communication application and a time that activates a communication application in which a communication application is activated immediately without conditions as an activation condition.

In the communication device according to the second embodiment, a communication fee inquiry may be made by activating the communication application and notifying of information relating to a data communication partner.

In the communication device according to the second embodiment, a communication fee inquiry may be made by notifying of a movement destination of a user.

The communication unit of the communication device according to the second embodiment may be compatible with each communication path that a plurality of communication carriers run. Further, a communication fee inquiry for each communication path when using a network may be made through the communication unit, and communication may be performed using the relevant communication path by the control unit activating the communication application when at least one of the set activation conditions out of a communication fee of each communication path which is received by an inquiry is met.

Further, according to a third embodiment of the present disclosure, there is provided a communication system including: a fee prediction server that predicts a communication fee from a prediction of a trend of network loads; and a data communication terminal that performs data communication by activating a communication application that performs communication using a network, wherein the data communication terminal sets an activation condition of the communication application and receives a communication fee that is predicted by the fee prediction server, and the control unit activates the communication application when a communication fee meets an activation condition.

However, the "system" referred to here refers to a logical collection of a plurality of devices (or functional modules that realize specified functions), and whether or not each device or functional module is within the same housing is not particularly important.

Further, according to a fourth embodiment of the present disclosure, there is provided a charging method including: charging a communication fee per unit data with respect to a data communication terminal that performs communication using a network by setting a communication fee during a predetermined standard network load state to a standard communication fee; surcharging over the standard communication fee during a network load state that is higher than the standard network load state according to the network load state; and discounting from the standard communication fee during a network load state that is lower than the standard network load state according to the network load state.

In the charging method according to the fourth embodiment, a network load state is detected based on a value in which a capacity of data communication terminal at a base station is divided by the maximum capacity of a base station.

According to the embodiments of the present disclosure, it is possible to provide an excellent communication fee prediction device for directly acting to reduce changes in the load of demand for communication, that is, to distribute traffic, a communication device, a communication system, and a charging method.

According to the embodiments of the present disclosure, by setting the communication fee according to the network load to be in real time, a communication carrier is able to expect a distribution of the traffic load. As a result of being able to distribute traffic load, it is possible to avoid a lowering of communication quality due to network congestion, and it is further possible to avoid excessive investment in facilities.

Further, according to the embodiments of the present disclosure, it is possible to notify a terminal of the current communication fee or the predicted values of changes in the communication fee over time from a network. Further, the user of a data communication terminal is able to select a condition for activating a communication application from a plurality of options and to select an activation condition and a communication path with the optimal fee. Therefore, the user of the data communication terminal is able to activate a communication service when the communication fee is low. In a case when the data communication terminal is able to select a plurality of communication paths, since the current communication fee and the predicted values for changes in the communication fee over time are displayed, the user of the data communication terminal is able to select a communication path with a low communication fee to suppress the communication fee.

That is, according to the embodiments of the present disclosure, by displaying another option with a low network load (that is, where the communication fee is low) to a user that attempts to communicate when a network is congested and guiding the user thereto, it is possible to dynamically and efficiently reduce changes in the network load at a plurality of communication paths according to the time or place.

Further objects, characteristics, and advantages of the present disclosure will be made clear by the embodiments of the present disclosure and the detailed descriptions given below based on the attached drawings.

BRIEF DESCRIPTION OF THE DRAWINGS

FIG. 13 is a diagram that illustrates a communication sequence example that is executed between a data communication terminal, a fee prediction server, and a controlling host when a data communication terminal with no display function activates a communication application that uploads data onto the controlling host.

DETAILED DESCRIPTION OF EMBODIMENTS

Figure 1:
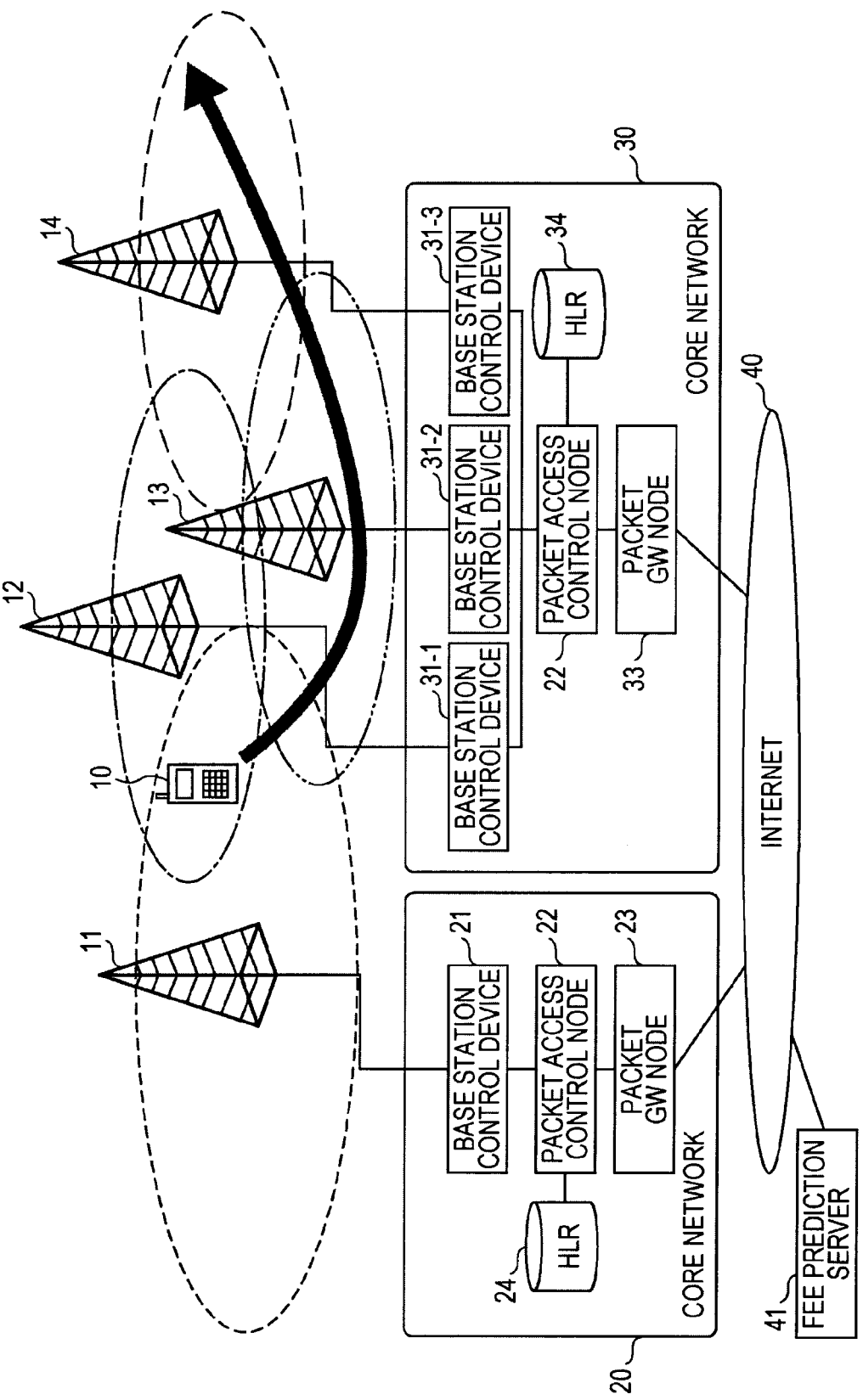
FIG. 1 is a diagram that illustrates a configuration example of a communication network to which the embodiments of the present disclosure are able to be applied.

The embodiment of the present disclosure will be described in detail below with reference to the drawings.

In a communication network to which the embodiments of the present disclosure are applied, communication fees with network loads in mind have been introduced. For example, communication fees are set to be low when the network is uncongested and to be higher when congested. Further, the data communication terminal is regularly notified of such communication fees from the network. Furthermore, future network loads are predicted, the communication fee is also predicted based thereon, and the user is notified of the predicted value. Therefore, the user is able to economize on communication costs by setting the activation condition of the communication application on the data communication terminal so that a communication application of low priority is activated automatically when the fee is low. Further, by each user respectively performing such a setting, it is possible to avoid the concentration of traffic of the system as a whole.

Further, in a case when the data communication terminal is able to use a plurality of data communication terminals by the user of the data communication terminal being on contract with a plurality of carriers, the data communication terminal being compatible with the communication systems of a plurality of communication carriers, or the like, the user is notified of the communication fee for each communication path. Alternatively, the communication fee for each time band of each communication path is predicted and the user is notified of the prediction. Not only is the user then able to select the cheapest communication path but the load is able to be distributed across a plurality of communication paths.

A communication fee that takes the network load into account may be an absolute value of a fee per unit data amount or may be a surcharge rate or a discount rate from the usual fees. In either case, the data communication terminal of a user is notified of or displays the communication fee. For example, the network load may be defined as a value in which the capacity of the communication terminal to a base station (value based on the number of terminals that are position registered at such a base station and the number of base stations that are communicating within the base station) is divided by the maximum capacity of the base station. Further, the communication fee may be set incrementally according to the rank of the network load.

An example of communication fees according to the rank of the network load is shown in the table below. In the table, the state of the network load is divided into five ranks, the standard network load state is between 30 and 70%, the communication fee at such a network load state is a standard communication fee R3, and the communication fees for the other ranks are set by a fee surcharge rate or a discount rate according to the load state of the network. The data communication terminal of the user may be notified of the fee surcharge rate or discount rate on the usual fee according to the current state of the network load. For example, a fee system as shown in the table below may be set for each communication carrier.

TABLE 1

| Network Load (%) | Communication Fee (per unit data amount) | Fee Surcharge/ Discount Rate |
|---|---|---|
| 0 to 10 | R1 | R1/R3 |
| 10 to 30 | R2 | R2/R3 |
| 30 to 70 (standard load) | R3 (standard communication fee) | 1 |
| 70 to 90 | R4 | R4/R3 |
| 90 to 100 | R5 | R5/R3 |

The network load is able to be determined, for example, based on the number of other data communication terminals that are position registered to the same base station as the base station to which the data communication terminal is position registered, and on the number of data communication terminals that are performing communication. In a case when places where traffic is concentrated are detected on nodes other than the base stations on the network, it is also possible to further multiply the value of the network load by an appropriate factor.

The communication partner of the data communication terminal may be a host on the Internet or may be present on a wireless network. In the case of the latter, by not only considering the base station that position registers the data communication terminal but also the network load relating to the base station that position registers the communication partner, the fee may be calculated by the total network load in which the network load of both is combined by an appropriate distribution ratio.

Therefore, when predicting the network load, it is important to consider the degree of congestion of the base station and the characteristics of the behavior of the user.

Here, the degrees of congestion of base stations change constantly according to the month and date and the time, and each base station has a variety of tendencies including the geographic characteristics thereof. For example, it is assumed that base stations have geographic characteristics such as, for example, the degree of congestion for a base station in the vicinity of a train station tending to increase during commute times in the mornings and the evenings, the degree of congestion for a base station in the vicinity of office buildings tending to increase at time bands during lunch breaks and after office hours, or the degree of congestion for a base station in the vicinity of a shopping center being high on weekends while the degree of congestion for a base station in the vicinity of office buildings is high on weekdays.

Further, it is assumed that the behavior of the user has characteristics for each user according to the time or the day of the week. The time or the route of commutes to work or school on weekdays has a relatively set pattern, and it is highly likely that behavioral patterns such as what sort of communication service is activated at what sort of timing also have set tendencies.

An embodiment in which a predetermined fee rank is designated and automatically selected when a user that uses a data communication terminal that is compatible with a plurality of communication paths activates a communication application such as downloading of content will be described below.

A configuration example of a communication network that is able to apply the embodiments of the present disclosure is illustrated in FIG. 1. A mobile data communication network is assumed in the communication network illustrated in the drawing.

A base station 11 is a base station operated by a communication carrier A, and is connected to a core network 20. On the other hand, base stations 12, 13, and 14 are base stations operated by a communication carrier B, and are connected to a core network 30.

Base station control devices 21 and 31 are respectively arranged within each of the core networks 20 and 30. Each of the base station control devices 21 and 31 is connected to a base station and performs connection control, handover control, or the like of a wireless circuit.

A packet access control node 22 ascertains the position of a data communication terminal that is position registered to the base station 11 and performs transmission of user traffic between a packet gateway node 23 and the base station. Similarly, a packet access control node 32 grasps the position of a data communication terminal that is position registered to each of the base stations 12 to 14 and performs transmission of user traffic between a packet gateway node 33 and the base stations 12 to 14.

The packet gateway nodes 23 and 33 are nodes that act as access servers to the Internet 40 following a connection request from a user that possesses a data communication terminal, and respectively transceive user IP packets between the packet access control nodes 22 and 23 using a packet transmission protocol of mobile data communication.

Home location registers (HLR) 24 and 34 retain user identification information such as IMSI (International Mobile Subscriber Identity) or MSISDN (MS International PSTN/ISDN Number) and information on subscription to packet exchange services. The HLR of the user is aware of the location of the user by the HLR being notified of the positional information of the user from the packet access control nodes 22 and 32 to which the user currently belongs.

A data communication terminal 10 is a terminal that is compatible with both the communication system of the communication carrier A and the communication system of the communication carrier B. In the configuration example of the communication network illustrated in FIG. 1, although the data communication terminal 10 is currently position registered to the base station 11, the data communication terminal 10 is also at a position in which signals from the base station 12 are easily receivable. Although not shown, it is assumed that a plurality of other data communication terminals are scattered across the communication network.

A fee prediction server 41 is arranged on the Internet 40. Each of the base stations 11 to 14 is connected to the fee prediction server 41 via core networks A and B and the Internet 40. The fee prediction server 41 predicts a future network load, also predicts the communication fee based thereon, and regularly notifies each data communication terminal.

Figure 2:
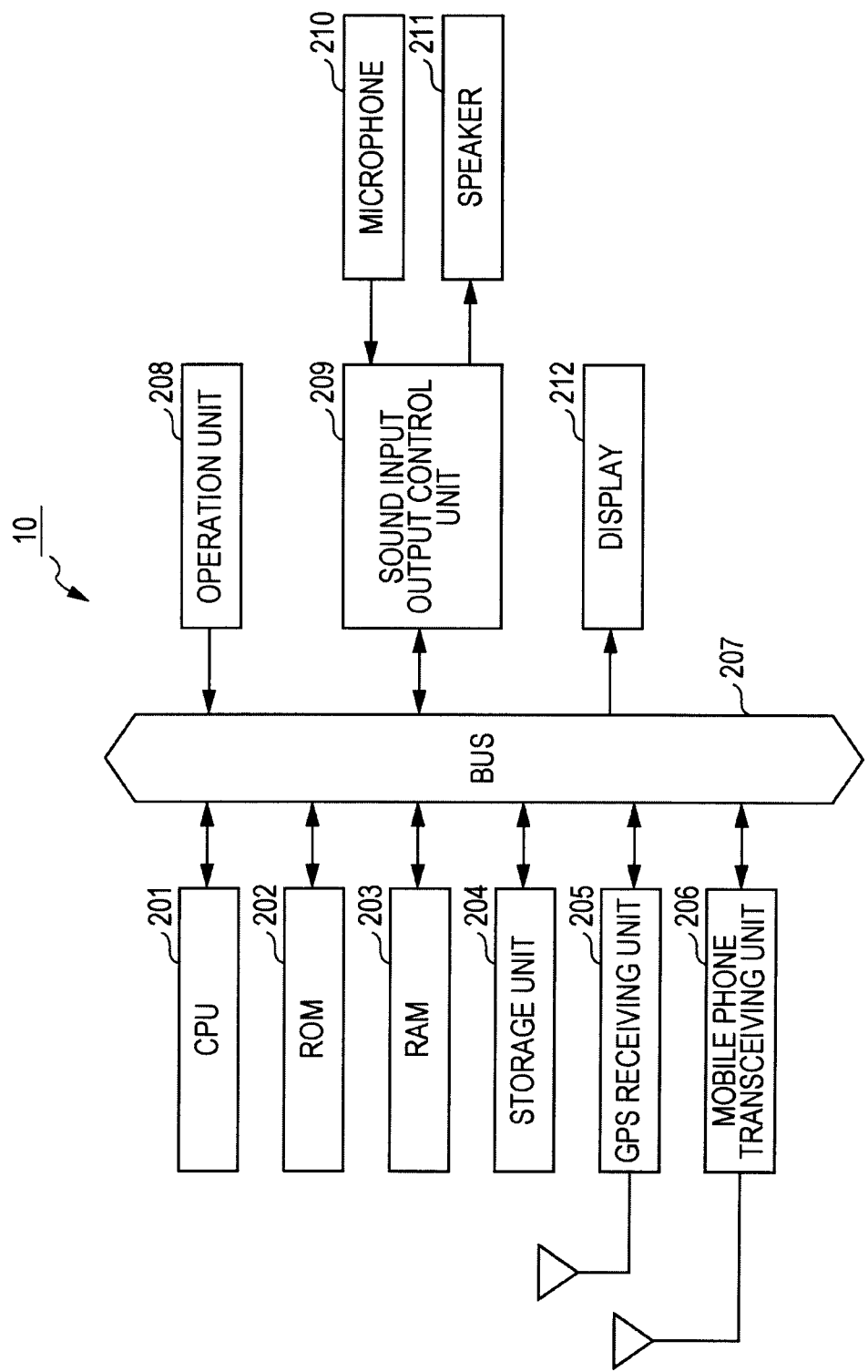
FIG. 2 is a diagram that schematically illustrates a configuration example of a data communication terminal.

A configuration example of the data communication terminal 10 is schematically illustrated in FIG. 2. The data communication terminal 10 shown in the drawing is a mobile phone.

A CPU (Central Processing Unit) 201 controls the actions of each of the parts according to a program that is stored in a ROM (Read Only Memory) 202 or a program that is loaded in a RAM (Random Access Memory) 203 from a storage unit 204 and executes various processes. Data that is used when the CPU 201 executes various processes and the like are also stored as appropriate in the RAM 203.

A communication application that performs data communication using a network is exemplified as a program that the CPU 201 executes. The communication application has a function of downloading data from a content server or uploading data to a control host (other data communication terminals or the like). Further, the activation condition of the communication application is able to be set according to a selection by the user or an instruction from the outside, and the set activation condition is retained by the storage unit 204 or the like.

The CPU 201, the ROM 202, and the RAM 203 are connected to one another via a bus 207. Further, the storage unit 204, a GPS receiving unit 205, a mobile phone transceiving unit 206, an operation unit 208, a sound input output control unit 209, and a display 212 are connected to the bus 207.

The mobile phone transceiving unit 206 is able to act as a fully-functioning cellular wireless transceiver according to an arbitrary common standard that includes standards such as, for example, W-CDMA and LTE. The mobile phone transceiving unit 206 is compatible with both the communication system of the communication carrier A and the communication system of the communication carrier B on the communication network illustrated in FIG. 1.

The operation unit 208 is configured by buttons, a jog dial, or the like, and receives an operation from the user. As user operations, other than inputting of a phone number and various settings on the data communication terminal 10, character input such as text creation or schedule entry are exemplified.

A microphone 210 converts the voice of the user into an electrical audio signal and inputs the audio signal. Further, a speaker 211 converts the audio signal into an audible signal that is audible to the user and outputs the audible signal. The sound input output control unit 209 supplies a basic analog audio signal to the speaker 211 while receiving an analog audio input from the microphone 210.

When the data communication terminal 10 is used as an ordinary mobile phone, a display 212 allows the user to see numbers that are dialed, images, calling status, the menu option, and other service information.

The GPS receiving unit 205 receives a GPS (Global Positioning System) signal from a plurality of orbiting satellites, and is able to position based on the principles of three-dimensional positioning. In the present embodiment, the fee prediction server 41 is regularly notified of positional information via the mobile phone transceiving unit 206 by the data communication terminal 10 regularly performing positioning using the GPS receiving unit 205. Here, as a device in which the data communication terminal 10 obtains positional information, other than the GPS receiving unit 205, an acceleration sensor module, a geomagnetic sensor module, and the like are exemplified.

In the configuration example of the communication network illustrated in FIG. 1, the fee prediction server 41 is arranged on the Internet (as described above). When predicting the network load, it is important that the fee prediction server 41 considers the degree of congestion of the base stations or the characteristics of the behavior of the user.

Figure 3:
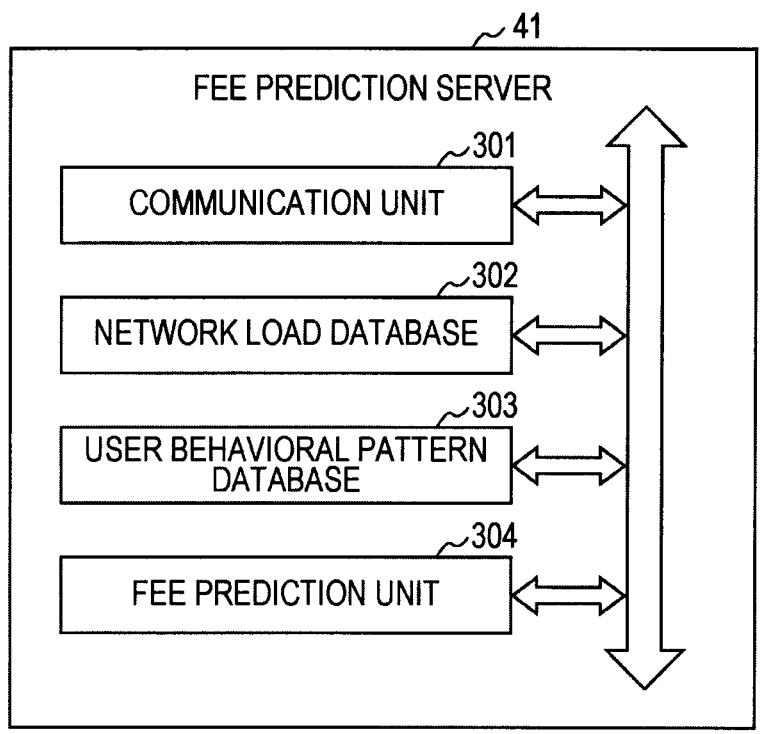
FIG. 3 is a diagram that schematically illustrates a configuration example of a fee prediction server.

A configuration example of the fee prediction server 41 is schematically illustrated in FIG. 3. The fee prediction server 41 shown in the drawing includes a communication unit 301 that communicates with a data communication terminal of the user, a network load database 302, a user behavioral pattern database 303, and a fee prediction unit 304, and performs prediction of the fee while considering the degree of congestion of base stations and the characteristics of the user.

The fee prediction server 41 regularly collects network load information of a plurality of base stations through the communication unit 301, for example, and retains the network load information in the network load database 302. Further, the fee prediction server 41 regularly collects the behavior history of the user such as the positional information or the communication history of the data communication terminals of a plurality of users through the communication unit 301, for example, and retains the behavior history in the user behavioral pattern database 303.

The data communication terminal of a user notifies the fee prediction server 41 of the current position or information that specifies the base station to which the data communication terminal is position registered (base station ID or the like) and inquires about the communication fee. In response, the fee prediction unit 304 of the fee prediction server 41 finds the past positional information of the data communication terminal of the requesting user from the user behavioral pattern database 303, analyzes the positional information, and estimates the path of base stations through which the user is due to pass through, and further, finds the network load information of base stations that are estimated to be passed through from the network load database 302, analyzes the network load information, and estimates the network load when the user passes through the base stations. Further, by referencing a fee table as illustrated in Table 1, the fee prediction unit 304 finds the current communication fee of the requesting user from the estimated network load and estimates the future communication fee. The fee prediction server 41 notifies the data communication terminal of the requesting user of the current communication fee and a predicted value of the communication fee through the communication unit 301.

When the user inquires about the fee to the fee prediction server 41, the fee prediction server 41 may be notified of information that would be relevant when predicting the communication path such as future movement destinations and planned departure times and when predicting the times at which the base stations on the path are passed through at the same time. The fee prediction server 41 is able to increase the accuracy of the communication fee prediction based on such information.

Further, when the user inquires about the fee to the fee prediction server 41, the fee prediction server 41 may be notified of the address information of the communication partner at the same time. In such a case, the fee prediction server 41 is able to estimate the communication fee by considering the degree of network congestion on not only the requesting user side but also on the communication partner side.

Figure 4:
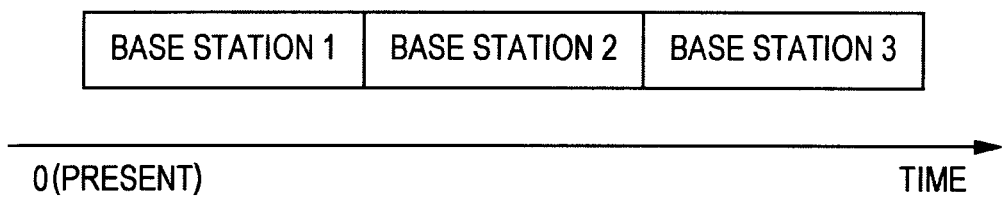
FIG. 4 is a diagram for describing a process leading up to a user inquiring about the fee to the fee prediction server and obtaining an answer (diagram illustrating a prediction of a base station path that a user takes)

The process from the user inquiring about the fee to the fee prediction server 41 to obtaining an answer will be described with reference to FIGS. 4 and 5.

For example, for the downloading of news content that the user performs on a regular basis, a communication application is activated on a data terminal that the user possesses, the data communication terminal notifies the fee prediction server 41 of the ID information of the base station 10 to which the data communication terminal is currently position registered, and inquires about the communication fee.

The fee prediction unit 304 of the fee prediction server 41 finds the past positional information of the data communication terminal of the requesting user from the user behavioral pattern database 303 and analyzes the past positional information. Further, as illustrated in FIG. 4, the fee prediction unit 304 predicts the base station path through which the user passes in the future and the times at which the base stations are passed through as base station 1→base station 2→base station 3.

Next, the fee prediction unit 304 of the fee prediction server 41 finds the network load information of each base station that is predicted to be passed through from the network load database 302, analyzes the network load information, and obtains an estimated value of the network loads of each base station that is passed through at the predicted times. As illustrated at the upper side of FIG. 5, if the change over time of the network loads of each of the base stations 1 to 3 that are passed through is read from the network load database 302, the network load of a base station to which position registration is predicted at a predicted time that the base station is passed through is the estimated value of the network load of the data communication terminal. Further, the fee prediction unit of the fee prediction server 41 references a fee table as illustrated in Table 1 and estimates the current communication fee and the future communication fee according to the predicted value of the network load as illustrated at the lower side of FIG. 5.

Furthermore, the fee prediction server 41 transmits the current communication fee and a predicted value of the future communication fee from the communication unit 301 and notifies the data communication terminal of the user.

Figure 5:
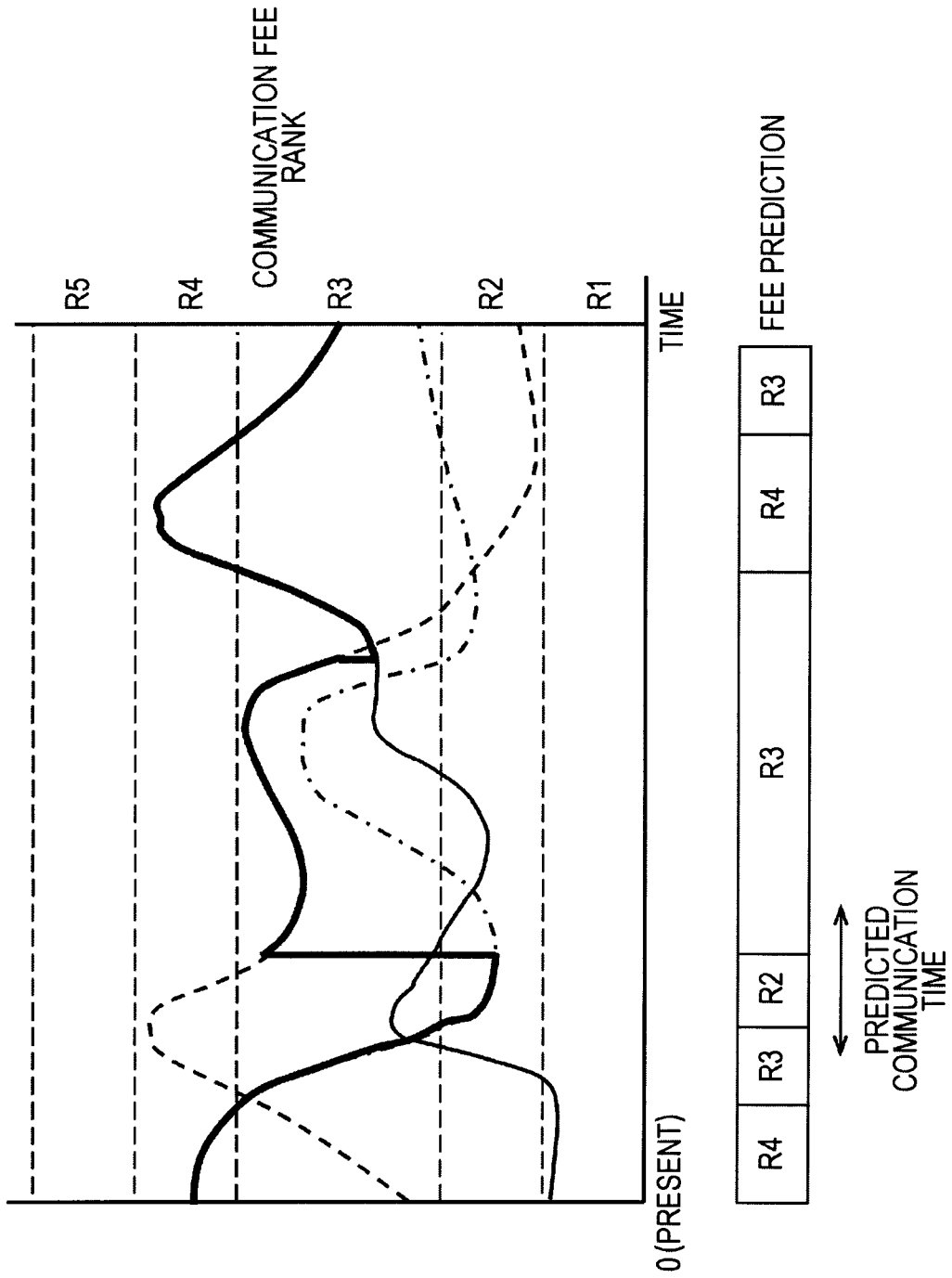
FIG. 5 is another diagram for describing a process leading up to a user inquiring about the fee to the fee prediction server and obtaining an answer (diagram illustrating predictions of the network load and the communication fee)

Further, the fee prediction unit 304 of the fee prediction server 41 is able to estimate the predicted communication time as illustrated at the lower side of FIG. 5 by obtaining the past communication history of the data communication terminal of the requesting user from the user behavioral pattern database 303, analyzing the communication history, and predicting the approximate data size that the user plans to download. Therefore, the fee prediction server 41 is able to recommend an activation timing of a communication application with which execution of the communication application is able to be completed at the lowest fee to the user.

Here, information display methods relating to the communication fee of a data communication terminal and selection methods by the user will be exemplified.

(1) A method in which it becomes possible for the user to select the activation condition of a communication application by the data communication terminal inquiring about the communication fee to the fee prediction server 41 and the data communication terminal displaying the communication fee when the user performs an activation operation of the communication application.

(2) A method in which it becomes possible for the user to select the activation condition by the data communication terminal inquiring about the communication fee to the fee prediction server 41 and the data communication terminal displaying the communication fee only in a case when the current communication fee is a predetermined fee rank or higher when the user performs an activation operation of the communication application. According to such a method, it is possible to request setting of the activation condition to the user only in a case when there is a surcharged fee, for example, and it is possible to avoid the trouble of the user setting the activation condition every time that the communication application is activated.

(3) A method of the data communication terminal activating a communication application in a case when once the user has registered the activation condition of the communication application in advance on the data communication terminal and the user performs an operation to activate the communication application, such an activation condition is satisfied within a predetermined period of time. It is also possible with such a method to avoid the trouble of setting the activation condition every time that the communication application is activated. Furthermore, by transferring the fee information to other data communication terminals and selecting the communication application activation condition from the other data communication terminals, even a data communication terminal without a display function is able to set the communication fee as the activation condition of the communication application. As a data communication terminal without a display function, for example, an MTC (Machine Type Communication) terminal that a person does not use for direction communication is exemplified. Meters, vending machines, electronic advertisements, and the like are MTC terminals.

(4) A method of displaying the communication fee on the data communication terminal by the data communication terminal inquiring about the fee to the fee prediction server 41 when the user performs a predetermined operation on the data communication terminal.

(5) A method of displaying the fee on the data communication terminal at all times by the data communication terminal regularly inquiring about the fee to the fee prediction server 41 in a communication state or a standby state.

(6) A method of displaying the communication fee for a predetermined amount of time on the communication terminal when the rank of the fee changes by the data communication terminal regularly inquiring about the fee to the fee prediction server 41 in a communication state or a standby state.

(7) A method of displaying the communication fee on the data communication terminal by the data communication terminal inquiring about the communication fee to the fee prediction server 41 when the data communication terminal performs a measurement of the wireless signal strength of the surroundings in a communication state or a standby state and the result of the measurement meets a certain condition. With such a method, it is possible to deduce the degree of congestion of a base station based on the ratio between the signal strength and the noise within the bandwidth of a pilot channel that is transmitted from the base station. The data communication terminal is able to deduce the change in the communication fee without performing communication with the fee prediction server 41 by regularly performing such a power measurement.

As the setting of the data communication terminal, the user may select any of the plurality of display methods and selection methods of the communication application activation condition described above.

Both the communication of regularly notifying the fee prediction server 41 of the positional information of the user from the data communication terminal and the communication of the data communication terminal inquiring about the communication fee to the fee prediction server 41 are by data communication. However, since such data amounts are extremely small data amounts compared to the data amounts involved in the communication applications for downloads or the like of content such as videos, music, and the like, in the above (1) to (7), methods of applying the activation condition only to communication applications that involve large data amounts are shown.

Both the communication of regularly notifying the fee prediction server 41 of the positional information of the user by the data communication terminal regularly inquiring about the communication fee to the fee prediction server 41 and the communication of the data communication terminal inquiring about the communication fee to the fee prediction server 41 may be performed only during time bands that are assumed to have a low fee at all times. Further, with a data communication terminal that corresponds to a plurality of communication paths, a method of selecting a communication path that has a low fee at all times is also possible.

Figure 10:
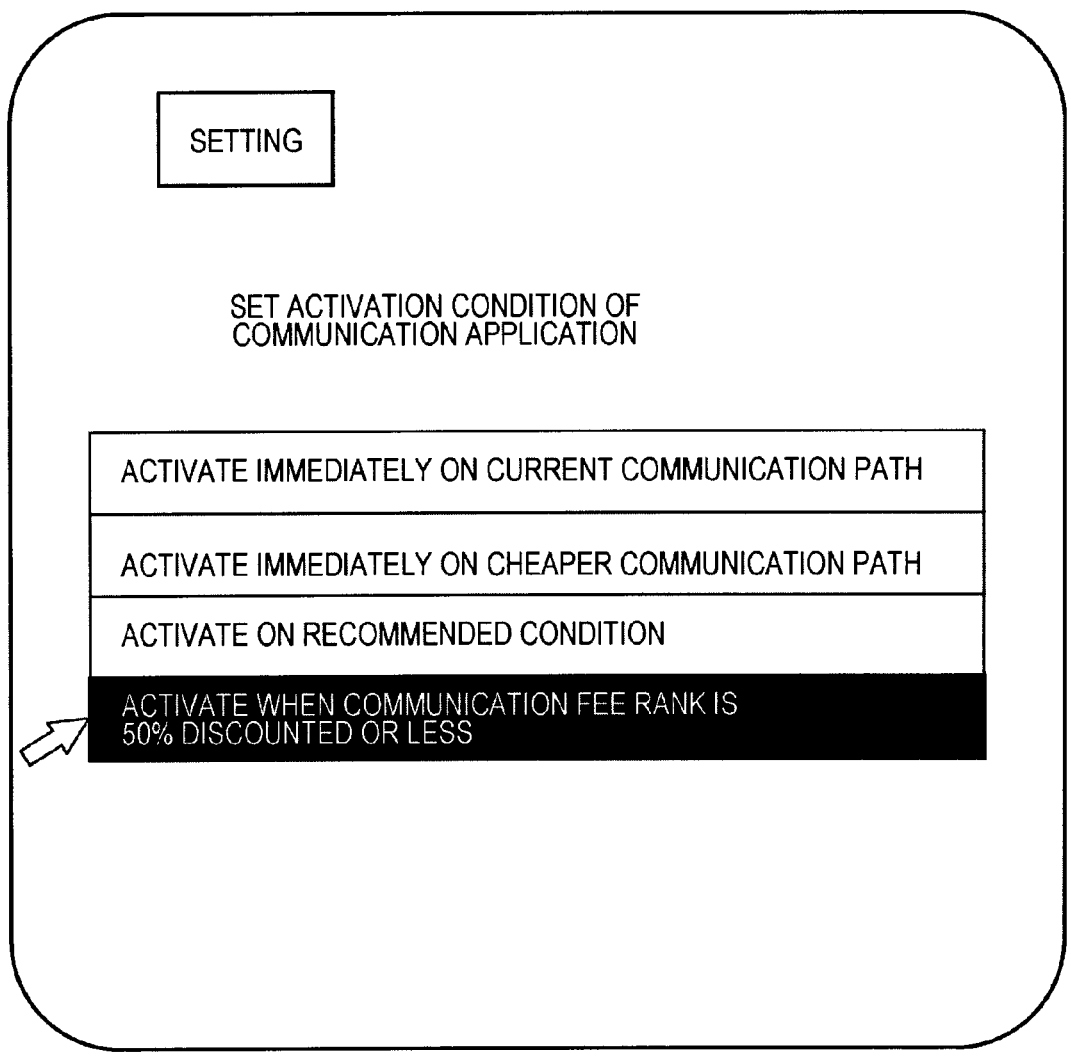
FIG. 10 is a diagram that illustrates a setting display example of an activation condition of a data communication terminal.

The user of the data communication terminal sets the activation condition of a communication application in advance via a setting screen as illustrated in FIG. 10, and stores the activation condition in the storage unit 204 within the data communication terminal. In the setting screen that is shown, "activate immediately on current communication path", "activate immediately on cheaper communication path", "activate on recommended condition", and "activate when communication fee rank is 50% discounted or less" are displayed on the menu as selectable activation conditions, out of which "activate when communication fee rank is 50% discounted or less" is selected.

When the user performs an activation operation of a communication application, the data communication terminal specifies the base station ID of a base station to which the data communication terminal is currently position registered through the mobile phone transceiving unit 206 and inquires about the fee to the fee prediction server 41. The fee prediction server 41 takes the behavioral pattern of the user from the user behavioral pattern database 303 and analyzes the behavioral pattern. For example, it is possible to determine from the user behavioral pattern database 303 that the data communication terminal is compatible with the communication systems of two communication carriers A and B, and in such a case, the fee prediction server 41 is able to notify the data communication terminal of the communication fee for base stations operated by each of the communication carriers A and B.

The fee prediction server 41 deduces the predicted movement path of the user as illustrated by the arrow in FIG. 1, for example, based on information taken from the user behavioral pattern database 303, further obtains an estimated value of the network load at the predicted time at which the base station that the user passes through is passed through from the network load database, and notifies the data communication terminal of the current communication fee and an estimated value of the future communication fee. The data communication terminal receives the fee information from the fee prediction server 41 through the mobile phone transceiving unit 206.

Figure 6:
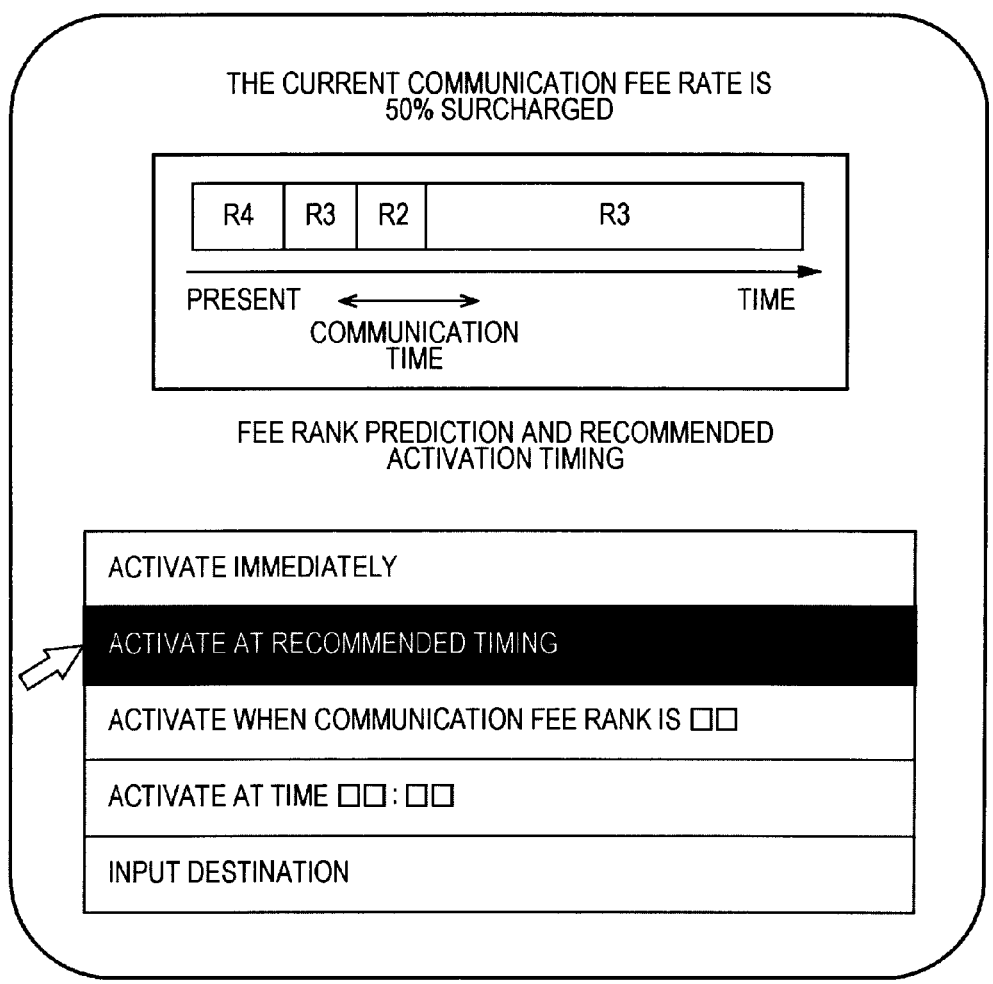
FIG. 6 is a diagram that illustrates a configuration example of a screen that displays information that is notified from the fee prediction server on the data communication terminal side.

A configuration example of a screen that displays information notified from the fee prediction server 41 on the data communication terminal side is illustrated in FIG. 6. On the upper side of the screen that is shown, information of the current communication fee "the current communication fee rate is 50% surcharged", the fee rank prediction based on the predicted base station path, and the recommended activation timing of the communication application are displayed. Further, at the lower side of the screen that is shown, a menu in which the user that is notified of the predicted value of the communication fee selects the activation condition or the like of the communication fee is displayed. In the example shown, "activate immediately", "activate at recommended timing", "activate when communication fee rank is □□", "activate at time □□:□□", and "input destination" are prepared as the menus, out of which "activate at recommended timing" is selected. The data communication terminal is able to automatically activate the communication application when the assumed activation condition and the fee information match by regularly inquiring about the fee to the fee prediction server 41 in the background.

Similarly, when a desired fee or a fee range is designated as the activation condition as with "activate when communication fee rank is □□", it is possible to activate the communication application automatically when the activation condition and the fee information match.

Further, in a case when the activation condition and the fee information do not match within a certain period of time, the data communication terminal is able to designate such a period so as to cancel the activation of the communication application.

Alternatively, in a case when the user wishes to eliminate the regular inquiry to the fee prediction server, the activation time of the communication application may be set from the predicted value of the fee as with "activate at time □□:□□" so that the communication application is automatically activated at such a time.

Even during data communication, it is assumed that the communication fee changes along with changes in the network load of base stations and switching of base stations to which the data communication terminal is to be position registered. Therefore, a fee range or a fee threshold value in which the communication application maintains action may be set in advance. The user may verify in advance whether communication is to be interrupted or continued when the fee range is exceeded and the fee rank changes.

Further, in a case when the data communication terminal is compatible with a plurality of communication paths, the current communication fee and the future communication fee for each communication path may be notified. For example, in a case when the data communication terminal is compatible with the communication path of the communication carrier A and the communication path of the communication carrier B and the data communication terminal is currently position registered to the base station of the communication carrier A, although the data communication terminal inquires about the communication fee by notifying the fee prediction server 41 of the base station ID of the communication operation A to which the data communication terminal is currently position registered when activating the communication application, by inquiring about the network load rate of the base station of the communication carrier B which is in the same area at the same time, it is possible to obtain the estimated value of the present communication fee and the future communication fee for each communication path.

Figure 7:
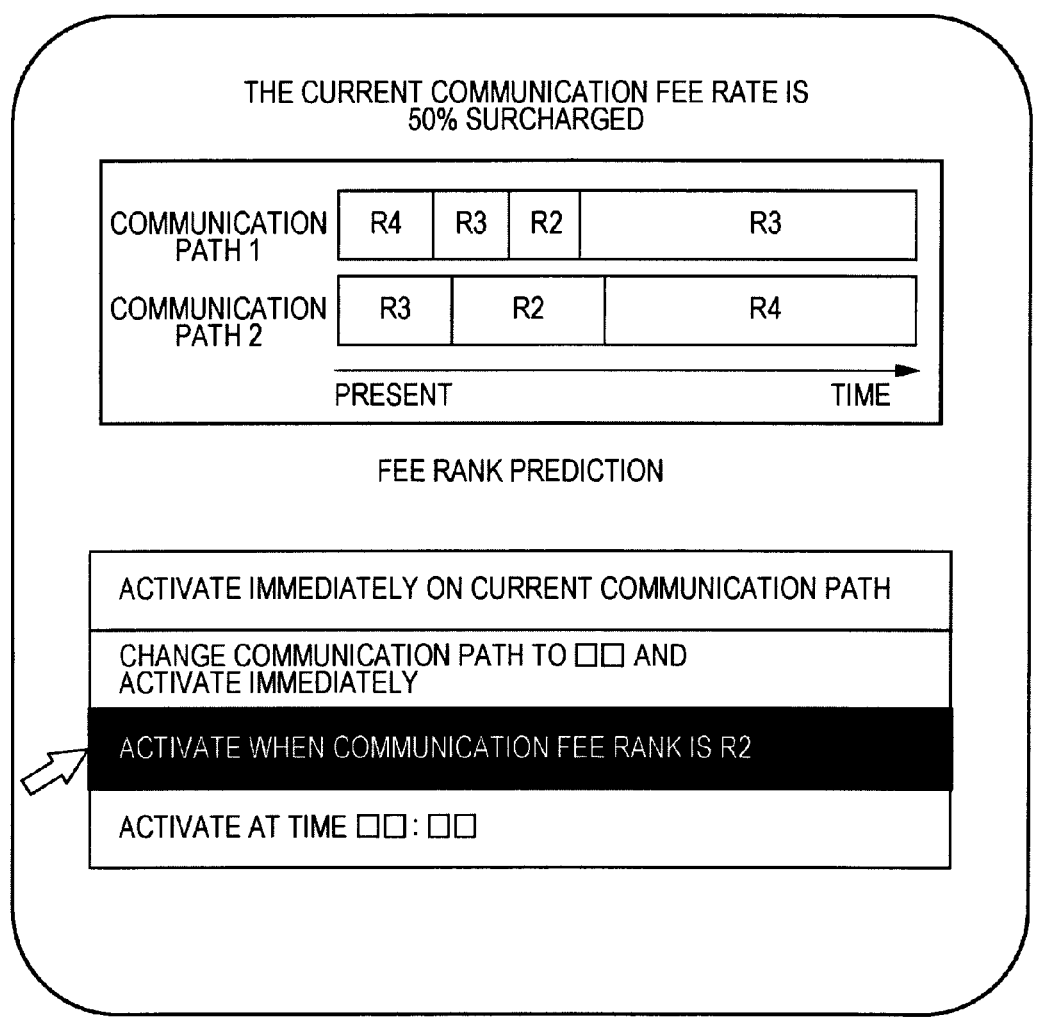
FIG. 7 is a diagram that illustrates a configuration example of a screen that displays information that is notified from the fee prediction server on the data communication terminal side that corresponds to a plurality of communication paths.

A configuration example of a screen that displays information that is notified from the fee prediction server 41 on the side of a data communication terminal that is compatible with a plurality of communication paths is illustrated in FIG. 7. At the upper side of the screen that is shown, the fee rank prediction based respectively on the predicted base station path for each of the compatible communication paths 1 and 2 and the recommended activation timing of the communication application are displayed. In the example shown, the communication path 1 is currently shown, that the communication fee rate thereof is "R4" is shown by a highlight display, and information of the current communication fee "current communication fee rate is 50% surcharged" is displayed.

At the lower side of the screen illustrated in FIG. 7, a menu in which the user that is notified of the predicted value of the communication fee selects the activation condition or the like of the communication application is displayed. In the example shown, "activate immediately", "change communication path to □□ and activate immediately", "activate when communication fee rank is R2", and "activate at time □□:□□" are prepared as the menus, out of which that "activate when communication fee rank is R2" is selected is shown by the highlight display.

For example, in a case when the fee of the communication path of the communication carrier B is the first to match the activation condition of the communication application, it is possible to activate the communication application via the base stations of the communication carrier B by the data communication terminal being position registered to the base stations of the communication carrier B after cancelling the position registration to the communication carrier A.

Here, in a case when there is no hope of satisfying the activation condition when the communication application is to be activated such as, for example, there being no communication paths at the fee rank set as the activation condition or lower, the data communication terminal may prompt the user to reselect the activation condition by generating a warning on the display 212.

Figure 8:
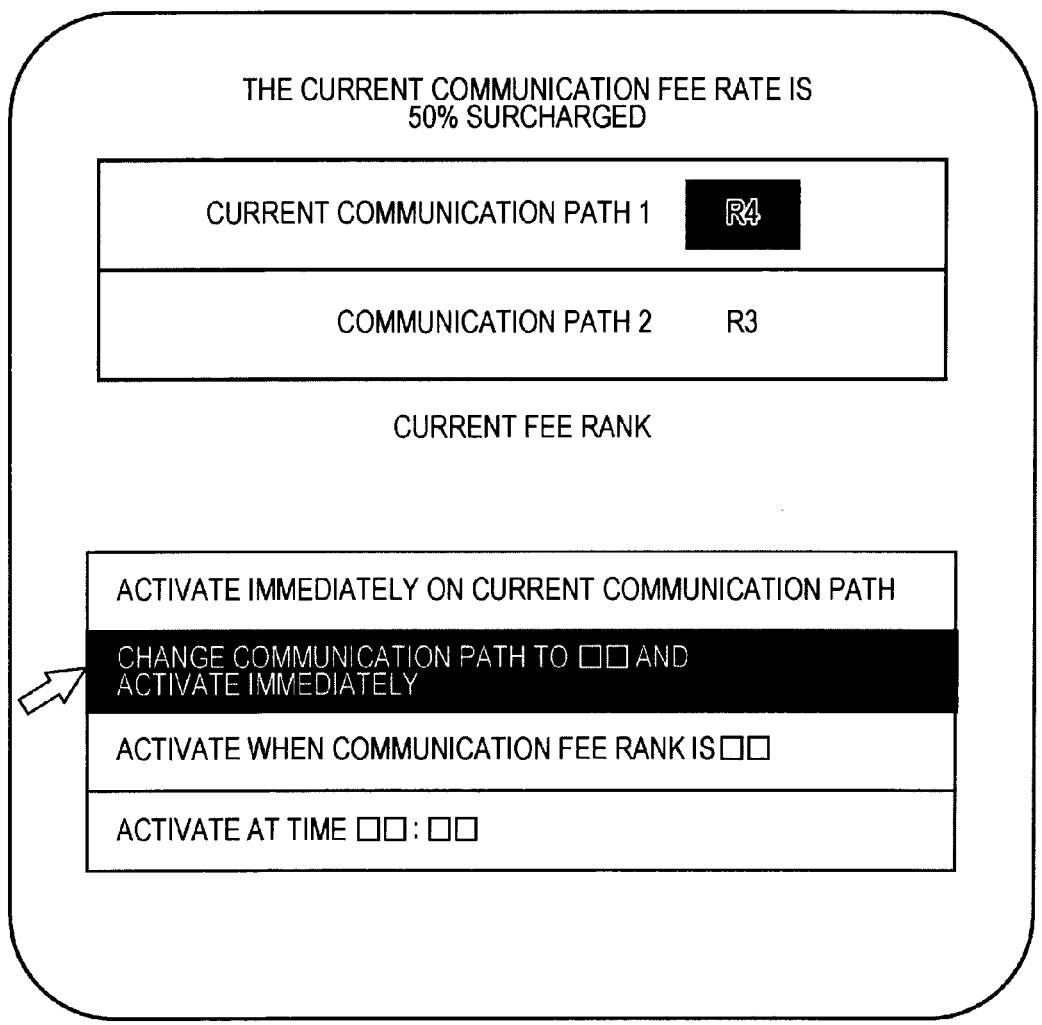
FIG. 8 is a diagram that illustrates another configuration example of a screen that displays information that is notified from the fee prediction server on the data communication terminal side that corresponds to a plurality of communication paths.

Further, another configuration example of a screen that displays information that is notified from the fee prediction server 41 on the side of the data communication terminal that is compatible with a plurality of communication paths is illustrated in FIG. 8. At the upper side of the screen that is shown, the current fee rank for each of the communication paths 1 and 2 is displayed. In the example shown, that the current fee ranks of the communication paths 1 and 2 are respectively R4 and R3 and that the communication path 1 is currently selected are shown by a highlight display, and information of the current communication fee "current communication fee rate is 50% surcharged" is displayed.

At the lower side of the screen illustrated in FIG. 8, a menu in which the user that is notified of the predicted value of the communication fee selects the activation condition or the like of the communication application is displayed. In the example shown, while "activate immediately", "change communication path to □□ and activate immediately", "activate when communication fee rank is □□", and "activate at time □□:□□" are prepared as the menus (as above), out of such option, that "change communication path to □□ and activate immediately" is selected is shown by the highlight display.

For example, if the communication path 2 is the basis of "□□" of "change communication path to □□ and activate immediately", it is possible to activate the communication application via the base stations of the communication carrier B by the data communication terminal position registering to the base stations of the communication carrier B by cancelling the position registration to the communication carrier A.

Figure 9:
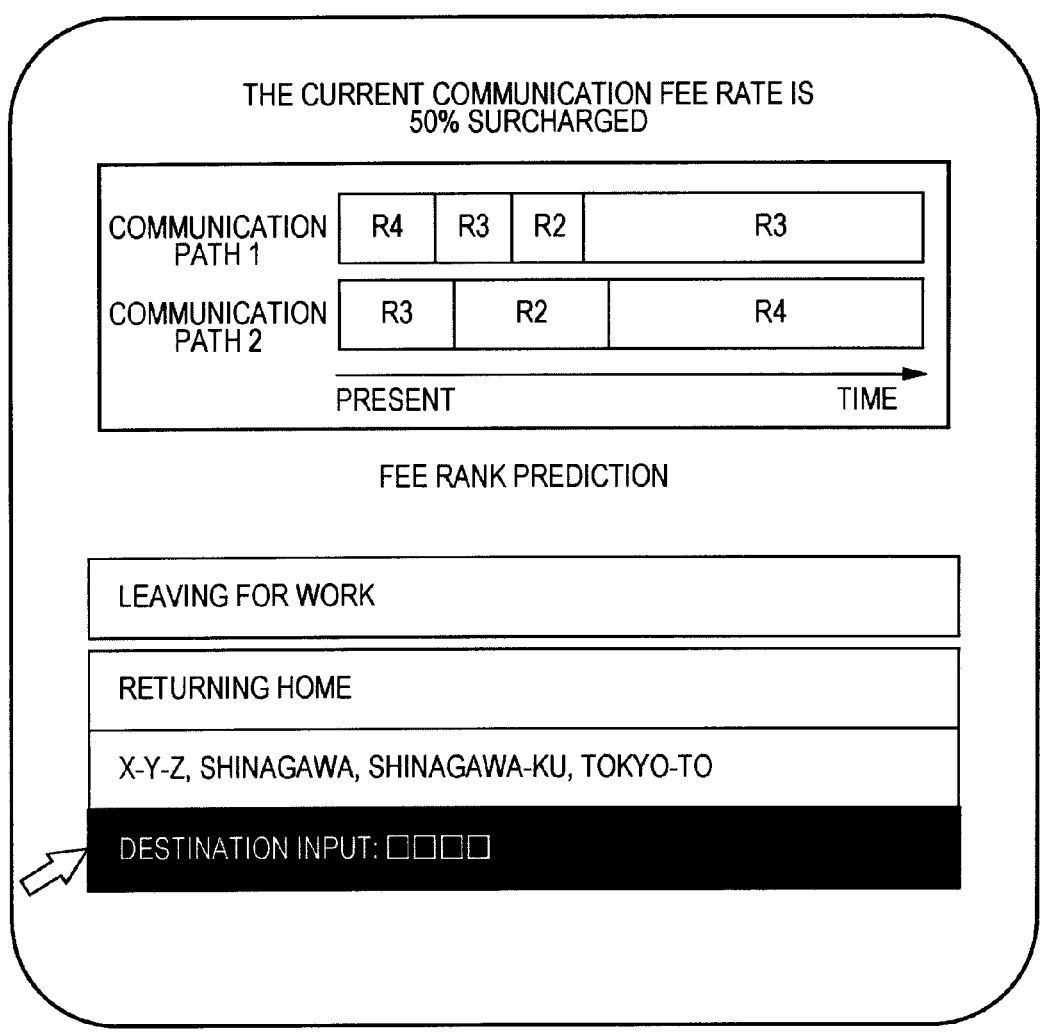
FIG. 9 is a diagram that illustrates still another configuration example of a screen that displays information that is notified from the fee prediction server on the data communication terminal side that corresponds to a plurality of communication paths.

Further, still another configuration example of a screen that displays information that is notified from the fee prediction server 41 on the side of the data communication terminal that is compatible with a plurality of communication paths is illustrated in FIG. 9. FIG. 9 exemplifies the input screen of the destination when the menu "input destination" is selected. When the data communication terminal inquires about the fee to the fee prediction server 41, the fee prediction server 41 is notified with the information of the destination which is input on the screen together. The fee prediction server 41 is able to increase the accuracy of the communication fee prediction based on the information on the destination (described above).

Figure 11:
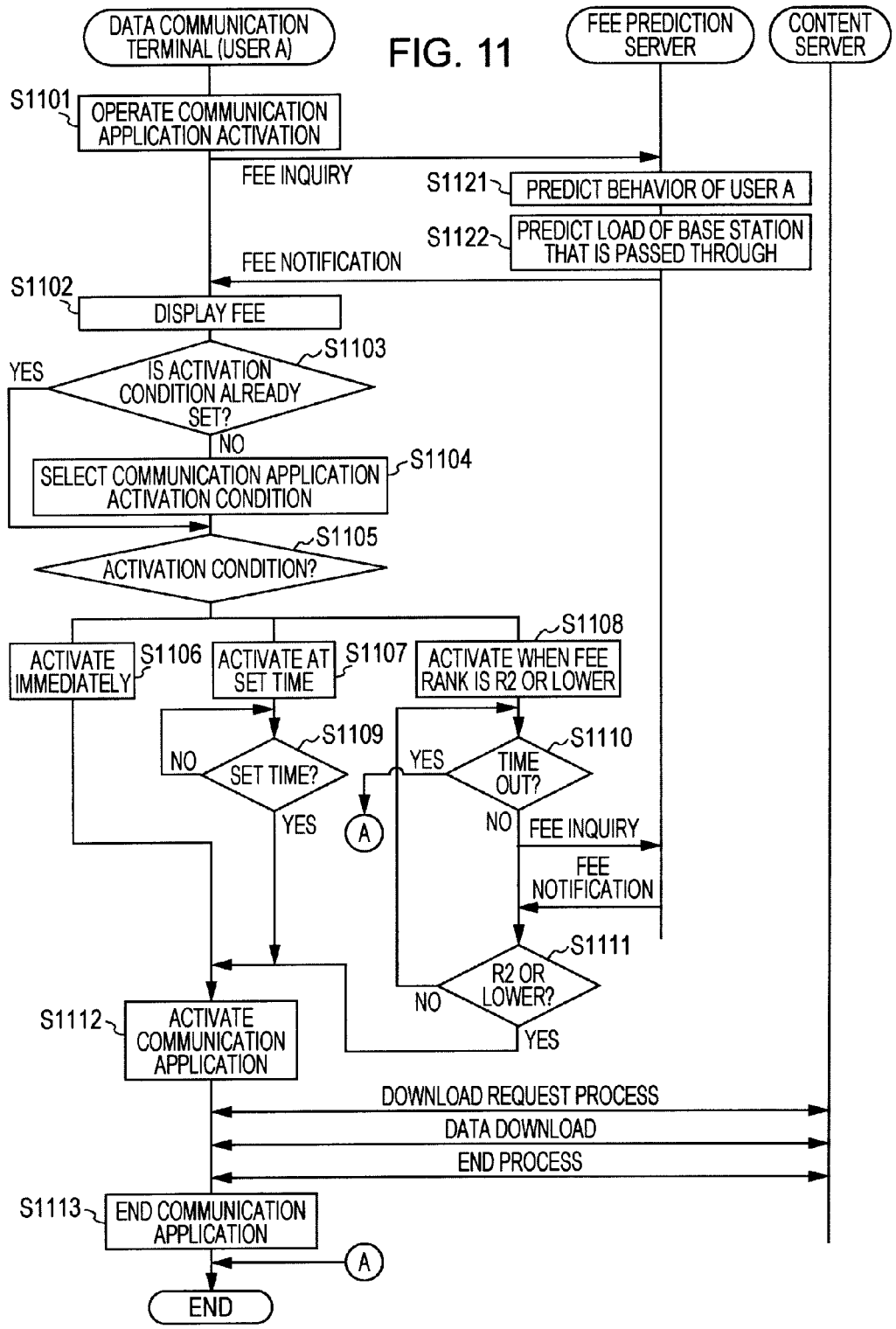
FIG. 11 is a diagram that illustrates a communication sequence example that is executed between a data communication terminal, a fee prediction server, and a content server when the data communication terminal activates a communication application that downloads content from a content server.

A communication sequence example that is executed between a data communication terminal, a fee prediction server, and a content server when the data communication terminal activates a communication application that downloads content from the content server is illustrated in FIG. 11.

When a user A performs an activation operation of the communication application on the data communication terminal (S1101), the data communication terminal notifies the fee prediction server 41 of the current position or information to specify the base station to which the data communication terminal is position registered (base station ID or the like) and inquires about the communication fee.

The data communication terminal may make an inquiry of the communication fee not when an activation operation of the communication application is performed by the operation unit 208 but when an operation of the fee inquiry is performed by the operation unit 208 or regularly. Alternatively, the data communication terminal may make an inquiry of the communication fee according to the results of a wireless measurement such as detecting a handover by the mobile phone transceiving unit 206.

Once the fee prediction unit 304 of the fee prediction server 41 receives an inquiry from the data communication terminal, the fee prediction unit 304 takes the behavior history of the user A such as past positional information and the communication history of the data communication terminal from the user behavioral pattern database 303, analyzes the behavior history, and predicts the behavior of the user A such as the path of base stations to be passed through in the future, the approximate data size that is planned for download, and the like (S1121). Furthermore, the fee prediction unit 304 of the fee prediction server 41 takes the network load information of the base stations that are estimated to be passed through from the network load database 302, analyzes the network load information, and estimates the network load for downloading the planned data when the user passes through the base stations (S1122). Further, the fee prediction unit 304 of the fee prediction server 41 computes the current communication fee of the user A from the estimated network load while estimating the future communication fee, and notifies the data communication terminal of the user A.

The data communication terminal of the user A screen displays the information on the communication fee which is notified from the fee prediction server 41 on the display 212 (S1102). The configuration example of the screen is as previously described with reference to FIG. 6.

Here, when the activation condition for activating the communication application for downloading content is not yet set in the data communication terminal (NO in S1103), the user A is made to perform selection of the activation condition of the communication application by displaying a setting screen of the activation condition as illustrated in FIG. 10 on the display 212 (S1104). The selection of the activation condition in S1104 may be performed only in a case when the communication fee that is notified from the fee prediction server 41 exceeds a fee threshold value that is stored in the storage unit 204. Alternatively, instead of the user A being made to select the activation condition, the activation condition may be stored in the storage unit 204 of the data communication terminal in advance.

In addition, the data communication terminal checks the activation condition that is set (S1105). When "activate immediately" is set as the activation condition (S1106), the communication application is activated immediately (S1112).

Further, when "activate at set time" is set as the activation condition (S1107), activation of the communication application waits until the arrival of the set time (NO in S1109).

Furthermore, when "activate when fee rank is R2 or lower" is set as the activation condition, activation of the communication application waits until the rank of the communication fee that is notified becomes R2 or lower (NO in S1111) by repeating the inquiry about the communication fee to the fee prediction server 41 until time out (NO in S1110). Here, if time runs out (YES in S1110) before the fee rank becomes R2 or lower (NO in S1111), the data communication terminal ends the present processing routine.

When the data communication terminal satisfies the set activation condition and activates the communication application (S1112), the data communication terminal performs a download request process to the content server and performs download of the relevant data. Further, once the download of the data is completed, the data communication terminal performs a predetermined end process and ends the communication application (S1113).

Figure 12A:
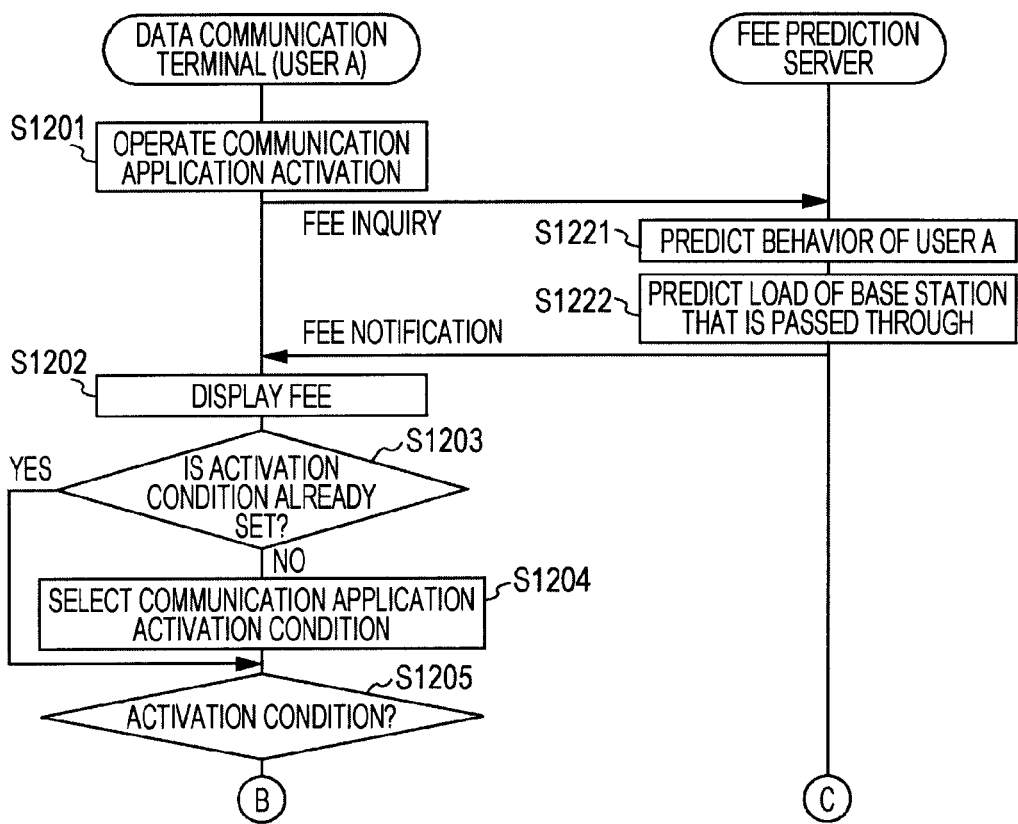
FIGS. 12A and 12B are diagrams that illustrate another communication sequence example that is executed between a data communication terminal, a fee prediction server, and a content server when the data communication terminal activates a communication application that downloads content from a content server.
Figure 12B:
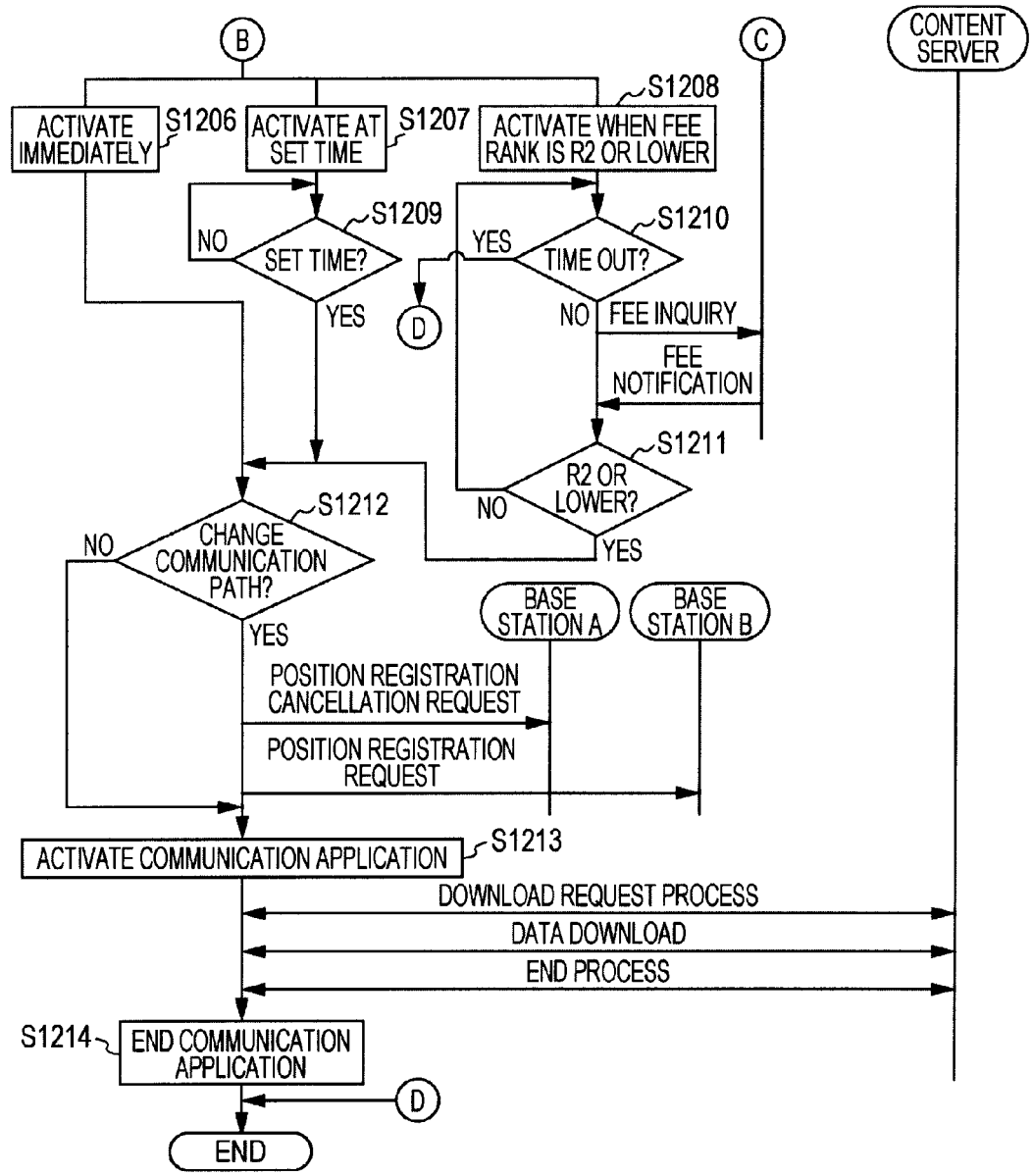

Furthermore, another example of a communication sequence that is executed between a data communication terminal, a fee prediction server, and a content server when the data communication terminal activates a communication application to download content from the content server is illustrated in FIGS. 12A and 12B. In FIGS. 12A and 12B, it is assumed that the data communication terminal of the user A is compatible with both communication paths of the communication carrier A (base station A) and the communication carrier B (base station B).

When the user A performs an activation operation of the communication application to the operation unit 208 of the data communication terminal (S1201), the data communication terminal notifies the fee prediction server 41 of the current location or information (base station ID or the like) that specifies the base station to which the data communication terminal is position registered and inquires about the communication fee.

The data communication terminal may make an inquiry of the communication fee not when an activation operation of the communication application is performed by the operation unit 208 but when an operation of the fee inquiry is performed by the operation unit 208 or regularly. Alternatively, the data communication terminal may make an inquiry of the communication fee according to the results of a wireless measurement such as detecting a handover by the mobile phone transceiving unit 208.

Once the fee prediction unit 304 of the fee prediction server 41 receives an inquiry from the data communication terminal, the fee prediction unit 304 finds the behavior history of the user A such as past positional information and the communication history of the data communication terminal from the user behavioral pattern database 303, analyzes the behavior history, and predicts the behavior of the user A (S1221). Furthermore, the fee prediction unit 304 of the fee prediction server 41 takes the network load information of the base stations that are estimated to be passed through from the network load database 302, analyzes the network load information, and estimates the network load for downloading the planned data when the use passes through the base stations (S1222). Further, the fee prediction unit 304 of the fee prediction server 41 estimates the current communication fee of the user A for each communication path from the estimated network load while estimating the future communication fee, and notifies the data communication terminal of the user A.

The data communication terminal of the user A screen displays the information on the communication fee which is notified from the fee prediction server 41 on the display 212 (S1202). The configuration example of the screen is as previously described with reference to FIGS. 7 to 9.

Here, when the activation condition for activating the communication application for downloading content is not yet set in the data communication terminal (NO in S1203), the user A is made to perform selection of the activation condition of the communication application by displaying a setting screen of the activation condition as illustrated in FIGS. 7 to 9 on the display 212 (S1204). The selection of the activation condition in S1204 may be performed only in a case when the communication fee that is notified from the fee prediction server 41 exceeds a fee threshold value that is stored in the storage unit 204. Alternatively, instead of the user A being made to select the activation condition, the activation condition may be stored in the storage unit 204 of the data communication terminal in advance.

In addition, the data communication terminal checks the activation condition that is set (S1205). When "activate at set time" is set as the activation condition (S1207), the activation of the communication application waits unit the arrival of the set time (NO in S1209).

Furthermore, when "activate when fee rank is R2 or lower" is set as the activation condition (S1208), activation of the communication application waits until the rank of the communication fee that is notified becomes R2 or lower (NO in S1211) by repeating the inquiry about the communication fee to the fee prediction server 41 until time runs out (NO in S1210). Here, if time runs out (YES in S1210) before the fee rank becomes R2 or lower (NO in S1211), the data communication terminal ends the present processing routine.

In such a communication sequence example, the communication path with currently the lowest communication fee is selected. Therefore, when "activate immediately" is set as the activation condition (S1206), the set time arrives (YES in S1209), or the fee rank becomes R2 or lower (YES in S1211), it is checked whether the communication path of the base station to which the data communication terminal is currently position registered is the lowest communication fee, in other words, whether or not the communication path ought to be changed (S1212). For example, when although the position registration is currently on the base station A, the communication fee of a communication path through the base station B is lower (YES in S1212), the data communication terminal performs a change of the communication path by performing position registration by requesting position registration to the base station B after cancelling the position registration by requesting cancellation of the position registration to the base station A.

When the data communication terminal satisfies the set activation condition and activates the communication application (S1213), the data communication terminal performs a download request process to the content server and performs download of the relevant data. Further, once the download of the data is completed, the data communication terminal performs a predetermined end process and ends the communication application (S1214).

By transferring the fee information to other data communication terminals and selecting the communication application activation condition from the other data communication terminals, it is possible to set the communication fee as the activation condition of the communication application even with a data communication terminal without a display function such as an MTC terminal (described above). A communication sequence example that is executed between a data communication terminal, a fee prediction server, and a control host when a data communication terminal without a display function activates a communication application for uploading data to the control host is illustrated in FIG. 13. In FIG. 13, it is assumed that the data communication terminal of the user A is compatible with both communication paths of the communication carrier A (base station A) and the communication carrier B (base station B).

When the activation of the communication application is instructed by receiving an activation request of the communication application from the control host (other data communication terminals or the like) or the like (S1301), the data communication terminal notifies the fee prediction server 41 of the current position or information (base station ID or the like) that specifies the base station to which the data communication terminal is currently position registered and inquires about the communication fee.

The data communication terminal may make an inquiry of the communication fee not when the activation of the communication application is performed but regularly. Alternatively, the data communication terminal may make an inquiry of the communication fee according to the results of a wireless measurement such as detecting a handover by the mobile phone transceiving unit 206.

Here, when the activation condition is attached to the activation request of the communication application, the data communication terminal retains the activation condition in the storage unit 204. Alternatively, the activation condition may be transmitted from the control host in advance, and similarly, the data communication terminal retains the received activation condition in the storage unit 204. Alternatively, instead of transmitting the activation condition from the control host, the activation condition may be stored in advance in the storage unit 204 of the data communication terminal. In any case, the data communication terminal is able to set the activation condition of the communication application freely without a user interface.

When the fee prediction server 41 receives an inquiry from the data communication terminal, the fee prediction server 41 takes the network load information of the base station to which the data communication terminal is currently position registered from the network load database 302, analyzes the network load information, estimates the network load for uploading the planned data, estimates the current communication fee and the future communication fee for each communication path from the estimated network load, and notifies the data communication terminal.

In addition, when the data communication terminal reads the activation condition of the communication application from the storage unit 204 (S1302), the data communication terminal checks the activation condition that is set (S1303).

When "activate at set time" is set as the activation condition (S1305), the activation of the communication application waits until the arrival of the set time (NO in S1307).

Furthermore, when "activate when fee rank is R2 or lower" is set as the activation condition (S1306), activation of the communication application waits until the rank of the communication fee that is notified becomes R2 or lower (NO in S1309) by repeating the inquiry about the communication fee to the fee prediction server 41 until time runs out (NO in S1308). Here, if time runs out (YES in S1308) before the fee rank becomes R2 or lower (NO in S1309), the data communication terminal ends the present processing routine.

In such a communication sequence example, the communication path with currently the lowest communication fee is selected. Therefore, when "activate immediately" is set as the activation condition (S1304), the set time arrives (YES in S1307), or the fee rank becomes R2 or lower (YES in S1309), it is checked whether the communication path of the base station to which the data communication terminal is currently position registered is the lowest communication fee, in other words, whether or not the communication path ought to be changed (S1310). For example, when although the position registration is currently on the base station A, the communication fee of a communication path through the base station B is lower (YES in S1310), the data communication terminal performs a change of the communication path by performing position registration by requesting position registration to the base station B after cancelling the position registration by requesting cancellation of the position registration to the base station A.

When the data communication terminal satisfies the set activation condition and activates the communication application (S1311), the data communication terminal performs an upload request process to the control host and performs upload of the relevant data to the control host. Further, once the upload of the data is completed, the data communication terminal performs a predetermined end process and ends the communication application (S1312).

Here, the communication sequence illustrated in FIG. 13 will be described with a terminal with a security camera function assumed as the data communication terminal.

It is assumed that the data communication terminal includes a camera in addition to the constituent elements illustrated in FIG. 2. In addition, when there is a request from the control host, the data communication terminal implements a communication application that uploads camera images that are regularly filmed and stored in the storage unit 204 to the control host. Further, as the activation condition of such a communication application, the condition to "activate when 50% discounted (fee rank R2) or lower" is designated by the control host in advance and stored in the storage unit 204. Furthermore, the current data communication terminal is position registered to the base station A of the communication carrier A.

The control host transmits the activation request of the communication application to the data communication terminal. The data communication terminal responds to the activation request, inquires about the fee to the fee prediction server 41, and receives the fee notification from the fee prediction server 41.

Furthermore, once the activation condition of the communication application is read from the storage unit 204, the data communication terminal activates the communication application according to the activation condition. In such a case, the data communication terminal regularly inquires about the fee to the fee prediction server 41 until the designated fee condition (fee rank is R2 or lower) is met.

Here, in a case when the fee rank becomes R2 first when passing through the communication path of the base station B operated by the communication carrier B, the data communication terminal is position registered to the base station B of the communication carrier B once the position registration to the base station A of the communication carrier A is cancelled.

In addition, once the communication application is activated and the camera image data is uploaded to the control host, the data communication terminal ends the communication application.

With the communication network illustrated in FIG. 1, the fee prediction server 41 notifies the data communication terminal of the data communication fee of each communication path which changes according to the time, place, and the communication path and a predicted value of the communication fee. Therefore, the data communication terminal or the user thereof is able to select the activation condition and communication path to obtain the optimum fee by selecting the condition for activating the communication application from a plurality of options. Further, since the communication paths that the plurality of data communication terminals select is distributed, it is anticipated that communication carriers would be able to distribute traffic loads.

As also illustrated in FIGS. 11 to 13, the network notifies the data communication terminal of the current communication fee and the predicted value of the change over time of the communication fee. Therefore, it is possible to activate a communication service when the communication fee is low on the data communication terminal side. In a case when the data communication terminal is able to select a plurality of communication paths, since the current communication fee and the predicted value of the change over time of the communication fee for each communication path are illustrated, it is possible to suppress the communication fee by the data communication terminal selecting a communication path with a low communication fee.

Further, by setting the communication fee according to the network load in real time, it is anticipated that communication carriers would be able to distribute traffic loads. Since it becomes possible to avoid a decrease in the communication quality due to network congestion, communication carriers are able to avoid excessive investments in facilities.

The present disclosure contains subject matter related to that disclosed in Japanese Priority Patent Application JP 2011-010851 filed in the Japan Patent Office on Jan. 21, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication fee prediction device comprising: a communication unit; a network load information management unit that collects and retains network load information of each base station through the communication unit; a user behavior history management unit that collects and retains positional information of a data communication terminal of a user through the communication unit; and a fee prediction unit that estimates a later movement path of the data communication terminal based on past positional information of the data communication terminal which is retained in the user behavior history management unit, estimates a network load state when the data communication terminal passes through a base station on the estimated movement path based on the network load information of each base station which is held in the network load information management unit, and predicts a communication fee according to a combination in an appropriate distribution ratio of the network load state of the base station where the data communication terminal is currently position registered and a network load state of another base station where a second data communication terminal, which is a communication partner of the data communication terminal, is position registered, and predicts a communication fee according to a network load state of a base station on the estimated movement path based on the network load state of the base station on the estimated movement path, wherein the data communication terminal is notified of a current communication fee, a plurality of communication paths, and a predicted value of a communication fee corresponding to each of the plurality of communication paths through the communication unit.

2. A communication device to be used by a user comprising: a communication unit that performs wireless communication; a positional information obtaining unit that obtains information of a current position; an operation unit that receives an instruction of an operation; a control unit that executes various processes; and an activation condition setting section that sets an activation condition of a communication application that performs communication using a network, wherein a notification of positional information obtained by the positional information obtaining unit and a communication fee inquiry when using the network are made through the communication unit, an inquiry of a communication fee being made as activation of the communication application is instructed through the operating unit, wherein the activation condition includes selectable entries of activating the communication application immediately, activating the communication application at set time, and activating the communication application when a communication fee is lower or equal to a threshold value of a communication fee, and wherein communication is performed using the network by the control unit that activates the communication application when the set activation condition is met, wherein the communication fee that is received by the inquiry is based on a combination in an appropriate distribution ratio of a network load state of a base station where the communication device is currently position registered and a network load state of another base station where another communication device, which is a communication partner of the communication device, is position registered.

3. The communication device according to claim 2, further comprising:
a display unit,
wherein the communication fee that is received by the inquiry is displayed on the display unit and a screen for selecting an activation condition of the communication application is displayed on the display unit,
the activation condition setting section sets an activation condition that is selected through the screen, and
the communication is performed using the network by the control unit activating the communication application when the communication fee that is received by the inquiry meets the set activation condition.

4. The communication device according to claim 2,
wherein the activation condition setting section sets the activation condition of the communication application following an instruction that is received from a different host through the communication unit or sets the activation condition that is stored in advance, and
the communication is performed using the network by the control unit activating the communication application when the current communication fee meets the set activation condition.

5. The communication device according to claim 2, further comprising:
the operation unit that receives an operation by a user.

6. The communication device according to claim 4,
wherein the inquiry of the communication fee is made as activation of the communication application is instructed by the different host through the communication unit.

7. The communication device according to claim 2,
wherein the communication fee inquiry is made regularly.

8. The communication device according to claim 5,
wherein the inquiry of the communication fee is made as an inquiry of a communication fee is instructed through the operation unit.

9. The communication device according to claim 2,
wherein the inquiry of the communication fee is made according to a wireless measurement result in the communication unit.

10. The communication device according to claim 5, wherein the activation condition setting section performs setting of the activation condition as activation of the communication application is instructed through the operation unit.

11. The communication device according to claim 2,
wherein the activation condition setting section sets the activation condition based on information that is stored in advance in a predetermined storage unit.

12. The communication device according to claim 2, further comprising:
a storage unit that stores a threshold value of a communication fee in advance,
wherein the activation condition setting section prompts a user to select an activation condition when the communication fee that is received by the inquiry exceeds the threshold value.

13. The communication device according to claim 2,
wherein the activation condition setting section is able to set at least one of a range of communication fees that permit activation of a communication application and a time that activates the communication application in which the communication application is activated immediately without conditions as an activation condition.

14. The communication device according to claim 2,
wherein the communication fee inquiry is made by activating the communication application and notifying of information relating to the communication partner.

15. The communication device according to claim 2,
wherein the communication fee inquiry is made by notifying of a movement destination of a user.

16. The communication device according to claim 2,
wherein the communication unit is compatible with each communication path that a plurality of communication carriers run,
the communication fee inquiry for each communication path when using a network is made through the communication unit, and
communication is performed using a relevant communication path by the control unit activating the communication application when at least one of the set activation conditions out of a communication fee of each communication path which is received by the inquiry is met.

17. A communication system comprising: a fee prediction server that predicts a communication fee from a prediction of a trend of network loads at a plurality of communication paths; and a data communication terminal that performs data communication by activating a communication application that performs communication using a network, wherein the data communication terminal sets an activation condition of the communication application and receives a communication fee at each of the plurality of communication paths that is predicted by the fee prediction server, wherein the activation condition includes activating the communication application immediately, activating the communication application at set time, and activating the communication application when a communication fee is lower or equal to a threshold value of a communication fee, and wherein the data communication terminal comprising a control unit that activates the communication application when determining that the communication fee meets the activation condition, wherein the predicted communication fee is based on a combination in an appropriate distribution ratio of a network load state of a base station where the data communication terminal is currently position registered and a network load state of another base station where a second data communication terminal, which is a communication partner of the data communication terminal, is position registered.

18. A charging method comprising: charging a communication fee per unit data with respect to a data communication terminal that performs communication using a network by setting a communication fee during a predetermined standard network load state to a standard communication fee; surcharging over the standard communication fee during a network load state that is higher than the standard network load state according to the network load state; and discounting from the standard communication fee during the network load state that is lower than the standard network load state according to the network load state, wherein the network load state is detected based on a division of a value of capacity of the data communication terminal at a base station, which is based on a number of data communication terminals that are position registered at the base station and a number of base stations that are communicating within the base station, by a maximum capacity of the base station.

* * * * *